Jan. 19, 1960  P. G. BURMAN  2,921,747
NOZZLE
Filed Aug. 14, 1958
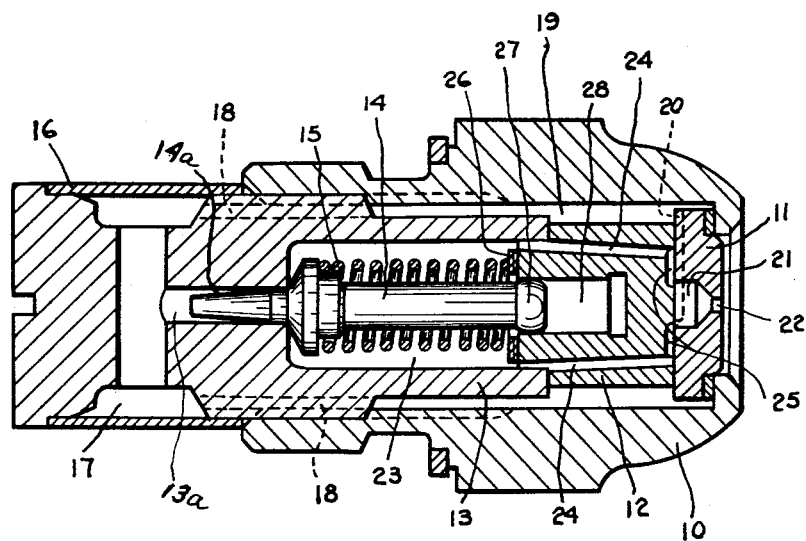
INVENTOR.
PAUL G. BURMAN
BY Raymond A. Paquin
ATTORNEY.

2,921,747
NOZZLE

Paul G. Burman, Longmeadow, Mass., assignor to American Bosch Arma Corporation, a corporation of New York Application August 14, 1958, Serial No. 754,975

3 Claims. (Cl. 239—464)

This invention relates to improvements in the field of nozzles designed for internal combustion engines such as, for example, jet engines with particular reference to those of the duplex or two stage type.

The principal object of the invention is to provide a new and improved nozzle for fuel injection apparatus which nozzle provides a finely atomized fuel spray over a wide flow range.

Another object is to provide a new and improved means for providing a low penetrating spray of fuel.

Another object is to provide a nozzle of the type set forth that is of the duplex or two stage type.

Another object is to provide a nozzle of the type set forth that provides an extremely close linear flow versus pressure characteristic.

Other objects and advantages of the invention will be apparent from the following description taken in connection with the accompanying drawing. It will be understood that changes may be made in the details of construction and arrangement of parts shown and described as the preferred forms have been given by way of illustration only.

Referring to the drawing:

The figure shows a longitudinal sectional view.

Referring more particularly to the drawing, the arrangement shown in the figure comprises a nozzle body 10 containing one or more orifice plates 11 at its orifice end, spacer 12 adjacent to said orifice plate 11, member 13 surrounding flow divider or metering valve 14, said flow divider or metering valve 14 being loaded by spring 15, and filter screen 16 overlying the fuel entrance passage.

Said nozzle body 10 further comprises a passage 17 through which the initial or idle fuel flows through two or more ducts 18 to clearance space 19, two or more tangential primary swirl slots 20 through which the idle fuel passes from said clearance space 19 to swirl chamber 21 and orifice 22 through which the fuel flows from said swirl chamber 21 to the engine which it accompanies.

The nozzle body 10 also includes metering valve 14 which controls the secondary or main fuel flow from passage 17 through passage 13a to chamber 23 under control of needle valve portion 14a of metering valve 14 to ducts 24 to which the secondary fuel flow passes from said chamber 23, and secondary swirl slots 25 communicating with said ducts 24 and tangential to swirl chamber 21.

As tangential primary swirl slots 20 and secondary swirl slots 25 are in separate pieces, they can be lapped down to control these flow areas.

The initiation and rate of flow to secondary swirl slots 25 is controlled by adjusting shims 26 and the rate of spring 15 and by contouring the pintle of metering valve 14. Said metering valve 14 further incorporates surge piston 27 fitted in dashpot 28 in spacer 12 in order to prevent chattering of said metering valve 14.

In operation, the initial or idle fuel passes through filter screen 16 and down through ducts 18 to clearance space 19. From said clearance space 19, said fuel then flows through tangential primary slots 20 to swirl chamber 21 and out the orifice 22 to the engine which it accompanies.

When the fuel pressure attains a sufficient height which is set at a predetermined level, metering valve 14 starts to open permitting the secondary or main fuel flow to pass into chamber 23 and, thence, to ducts 24. From said ducts 24, the fuel flows to the communicating secondary swirl slots 25 the spinning of which has already been initiated by the initial flow and thence to the tangential swirl chamber 21 and out the orifice 22 to the engine which the device accompanies.

From the above, it will be seen that I have provided new and improved means for obtaining all of the objects and advantages of the invention.

I claim:

1. In a device of the character described, a hollow nozzle body having fuel entrance port means and a discharge opening adjacent opposite ends thereof, an orifice plate overlying said discharge opening and having a discharge orifice therethrough, a member extending into said nozzle body, said member having a bore forming a chamber, a spacer between said member and said orifice plate, said member having a passage therethrough, a metering valve having a valve portion extending into said passage in said member and a piston portion extending into a dashpot in said spacer, a spring in said chamber normally urging said valve portion into said passage to control the main fuel flow, said spacer having fuel passage means therethrough to said discharge orifice, and primary fuel ducts connecting said fuel entrance port means and said discharge orifice in said orifice plate.

2. In a device of the character described, a hollow nozzle body having fuel entrance port means and a discharge opening adjacent opposite ends thereof, an orifice plate overlying said discharge opening and having a discharge orifice therethrough, a member extending into said nozzle body, said member having a bore forming a chamber, a spacer between said member and said orifice plate, said member having a passage therethrough, a metering valve having a valve portion extending into said passage in said member and a piston portion extending into a dashpot in said spacer, a spring in said chamber normally urging said valve portion into said passage to control the main fuel flow, said spacer having fuel passage means therethrough to said discharge orifice, and primary fuel ducts connecting said fuel entrance port means and said discharge orifice in said orifice plate, and means in said fuel ducts and fuel passage means to impart a swirl to the fuel.

3. In a device of the character described, a hollow nozzle body having fuel entrance port means and a discharge opening adjacent opposite ends thereof, an orifice plate overlying said discharge opening and having a discharge orifice therethrough, a member extending into said nozzle body, said member having a bore forming a chamber, a spacer between said member and said orifice plate, said member having a passage therethrough, a metering valve having a valve portion extending into said passage in said member and a piston portion extending into a dashpot in said spacer, a spring in said chamber normally urging said valve portion into said passage to control the main fuel flow, said spacer having fuel passage means therethrough to said discharge orifice, and primary fuel ducts connecting said fuel entrance port means and said discharge orifice in said orifice plate, and means in said fuel ducts and fuel passage means to impart a swirl to the fuel, said means comprising tangential slots.

References Cited in the file of this patent

UNITED STATES PATENTS

| | | |
|---|---|---|
| 2,556,493 | Fairfield et al. | June 12, 1951 |
| 2,569,033 | Wise | Sept. 25, 1951 |
| 2,572,606 | Fisher | Oct. 23, 1951 |
| 2,590,772 | Joyce | Mar. 25, 1952 |
| 2,653,054 | Purchas et al. | Sept. 22, 1953 |
| 2,751,253 | Purchas et al. | June 19, 1956 |